(12) United States Patent
Brady et al.

(10) Patent No.: US 7,594,069 B2
(45) Date of Patent: Sep. 22, 2009

(54) METHOD AND APPARATUS FOR SINGLE INSTRUCTION MULTIPLE DATA CACHING

(75) Inventors: Jeffrey T. Brady, Orlando, FL (US); Brian A. Buchner, Oviedo, FL (US); Rex E. McCrary, Oviedo, FL (US); Ralph C. Taylor, Deland, FL (US)

(73) Assignee: ATI Technologies, Inc., Markham, Ontario (CA)

( * ) Notice: Subject to any disclaimer, the term of this patent is extended or adjusted under 35 U.S.C. 154(b) by 119 days.

(21) Appl. No.: 10/788,225

(22) Filed: Feb. 26, 2004

(65) Prior Publication Data

US 2005/0251624 A1 Nov. 10, 2005

(51) Int. Cl.
*G06F 12/00* (2006.01)
(52) U.S. Cl. ...................................... 711/112
(58) Field of Classification Search .................. None
See application file for complete search history.

(56) References Cited

U.S. PATENT DOCUMENTS

| | | | | |
|---|---|---|---|---|
| 5,555,428 A | * | 9/1996 | Radigan et al. | 712/22 |
| 5,680,597 A | * | 10/1997 | Kumar et al. | 712/226 |
| 6,018,814 A | * | 1/2000 | Rockoff | 714/724 |
| 6,052,769 A | * | 4/2000 | Huff et al. | 712/3 |
| 6,253,299 B1 | * | 6/2001 | Smith et al. | 711/171 |
| 7,199,897 B2 | * | 4/2007 | Nomizu | 358/1.18 |

OTHER PUBLICATIONS

Microsoft Computer Dictionary, 5$^{th}$ Edition, © 2002, Microsoft Press.*

* cited by examiner

*Primary Examiner*—Brian R Peugh
(74) *Attorney, Agent, or Firm*—Vedder Price, P.C.

(57) ABSTRACT

An apparatus and method for single instruction multiple data caching includes a memory access request generator operative to receive a primary access request. The method and apparatus further includes a cache controller coupled to the memory access request generator, wherein the cache controller is operative to execute a memory request. The method and apparatus further includes a memory interface coupled to the cache controller, the memory interface operative to retrieve a plurality of requested data. The method and apparatus further includes a request processor coupled to the cache controller, the memory interface and the memory access request generator. The request processor is operative to receive a plurality of requested data and thereupon generate a plurality of parallel data outputs therefrom.

20 Claims, 8 Drawing Sheets

US 7,594,069 B2

METHOD AND APPARATUS FOR SINGLE INSTRUCTION MULTIPLE DATA CACHING

FIELD OF THE INVENTION

The present invention relates generally to data caching and more specifically to data caching in a single instruction multiple data processor.

BACKGROUND OF THE INVENTION

In a single instruction multiple data (SIMD) processing environment, providing parallel data streams for multiple processors requires effective coordination between memory storage devices and the multiple processing units. A common data cache, which is a memory cache shared by all processing elements, may be subject to performance degradation if multiple data streams for the SIMD processors are not well localized. Through not being well localized, the data may be disposed at various locations within the cache memory or may be inefficiently allocated within the cache memory. The performance degradation occurs when the cache has a high miss rate based on multiple data reads having to be unnecessarily executed and degradation occurs as significant amounts of data will be unnecessarily read multiple times. The degradation performance thereupon reduces performance quality.

The current approach for data caching with a SIMD processor is to serialize multiple data streams. This approach retrieves one data stream at a time through accessing the memory cache. Serializing the data avoids performance degradation associated with inefficiently localized data, but provides added computational expense of serializing the data access operations.

Therefore, a need exists for a method and apparatus that allows for efficient memory accesses in conjunction with a SIMD processor.

DETAILED DESCRIPTION OF A PREFERRED EMBODIMENT

Generally, an apparatus and method for single instruction multiple data caching includes a memory access request generator. A memory access request generator may be any suitable processing device including, but not limited to, one or more of a plurality of processors executing executable instructions, hardware, software, a combination of hardware and software or any other suitable implementation capable of performing and executing operations as discussed in further detail below. The memory access request generator is operative to receive a primary access request, wherein a primary access request includes a memory access request of a least address request for a set of addresses. The method and apparatus further includes a cache controller coupled to the memory access request generator, wherein the cache controller is operative to execute a memory request. The cache controller may be any suitable processing device including, but not limited to, one or more of a plurality of processors executing executable instructions, hardware, software, a combination of hardware and software or any other suitable implementation capable of performing and executing operations as discussed in further detail below.

The method and apparatus for SIMD caching further includes a memory interface coupled to the cache controller, the memory interface operative to retrieve a plurality of requested data, wherein the memory interface may be implemented in hardware, software or a combination thereof. The method and apparatus further includes a request processor coupled to the cache controller, the memory interface and the memory access request generator. The request processor is operative to receive a plurality of requested data and generate a plurality of parallel data outputs therefrom. The request processor may be any suitable processing device including, but not limited to, one or more of a plurality of processors executing executable instructions, hardware, software, a combination of hardware and software or any other suitable implementation capable of performing and executing operations as discussed in further detail below.

Figure 1:
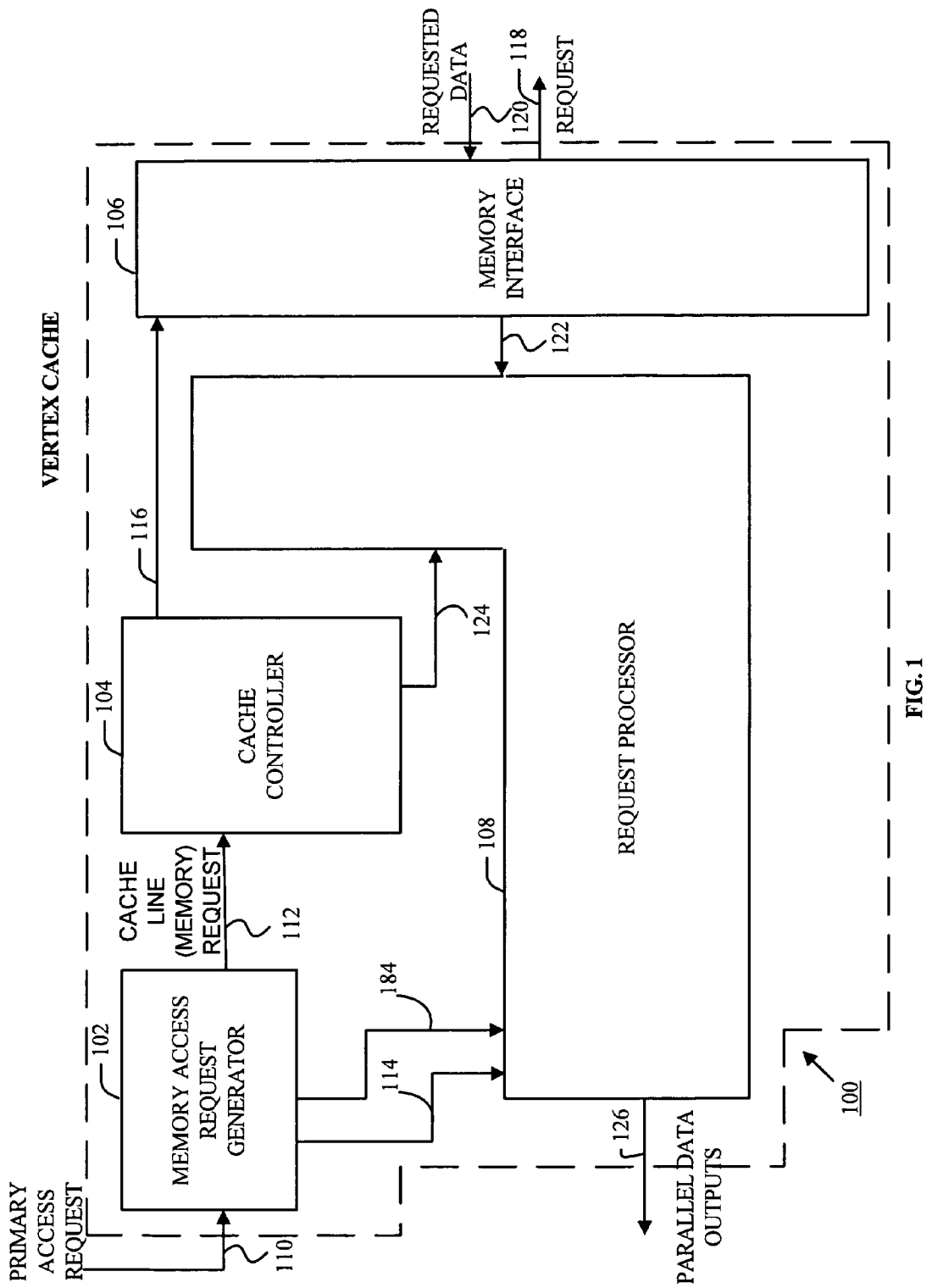
FIG. 1 illustrates one embodiment of an apparatus for single instruction multiple data caching in accordance with one embodiment of the present invention.

More specifically, FIG. 1 illustrates an apparatus for SIMD caching, otherwise referred to as a vertex cache 100 when applied to a shader pixel pipeline, wherein the application within the shader pipeline is provided for exemplary purposes only and not meant to be limiting of the present invention herein. The vertex cache 100 includes a memory access request generator 102, a cache controller 104, a memory interface 106 and a request processor 108. The memory access request generator 102 receives a primary access request 110 and provides a cache controller request 112 to the cache controller 104. The memory access request generator 102 also provides L2 cache memory commands 114, otherwise referred to herein as primary access requests, to the request processor 108. In addition, the memory access request generator provides secondary memory requests 184 to the request processor 108, as discussed in further detail below.

The cache controller 104 provides a missing data request 116 to the memory interface 106. The memory interface 106 provides a memory request 118 to a memory device (not shown), such as a system memory or any other internal or external memory location. In response thereto, the memory interface 106 receives requested data 120 and the memory interface 106 provides write data 122 to the request processor 108.

The request processor 108 receives L2 cache addresses 124 from the cache controller 104. The request processor 108, as described in further detail below, includes multiple caches, including a level one (L1) cache and a level two (L2) cache (not shown). The write data 122 is provided to the L2 cache and filtered, under control of the command from request 114 and the L2 cache addresses, within the request processor 108 to the L1 cache. The request processor 108 performs processing operations on the input data 122 and data previously stored within the internal cache (not shown) of the request processor 108 to produce parallel data outputs 126. The memory access request generator 102, the cache controller 104, the memory interface 106 and the request processor 108 will be described in greater detail below.

Figure 2A:
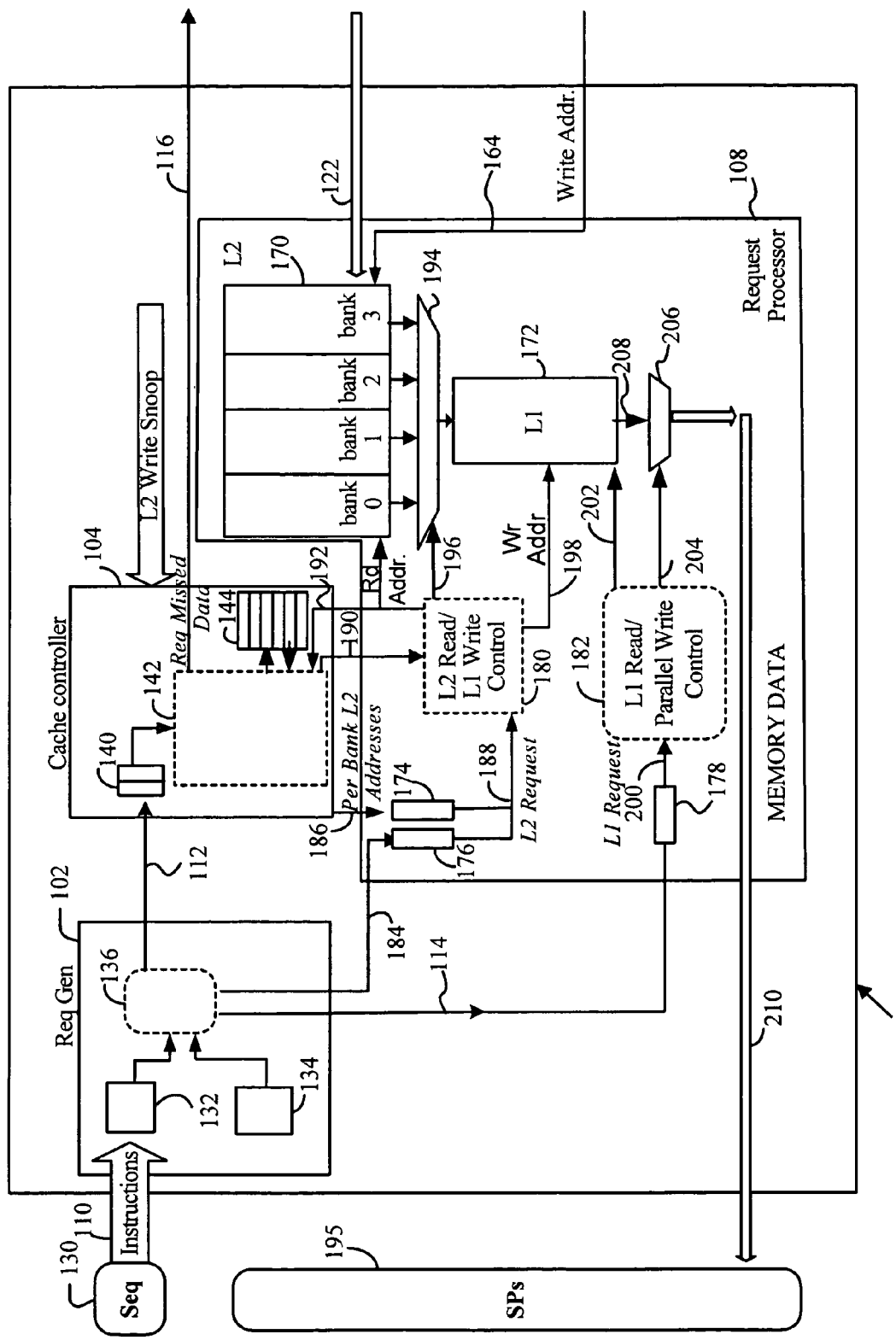
FIG. 2A illustrates a first portion of another embodiment of the apparatus for single instruction multiple data caching.
Figure 2B:
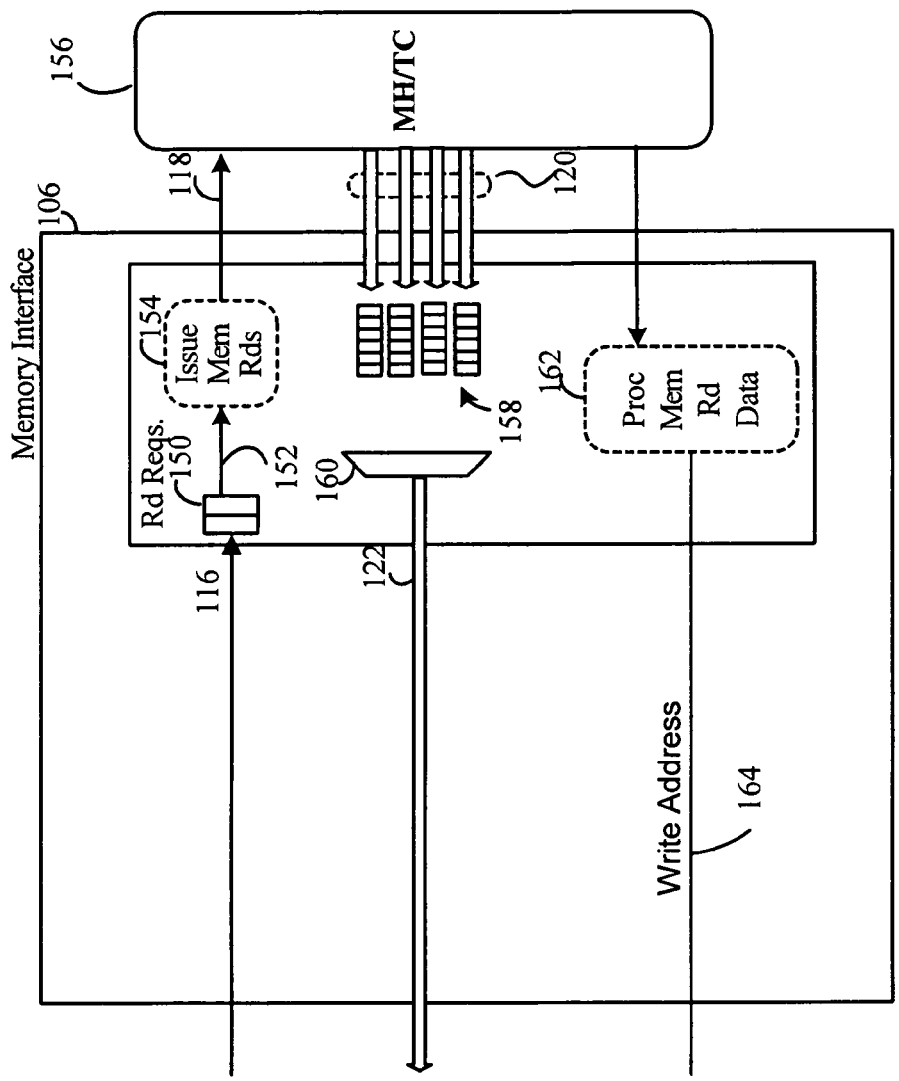
FIG. 2B illustrates a second portion of another embodiment of the apparatus for single instruction multiple data caching.

FIGS. 2a and 2b illustrates a first portion and second portion of another embodiment having a greater level of detail of the vertex cache 100 including the memory access request generator 102, the cache controller 104, the memory interface 106 and the request processor 108. The primary access requests 110 are provided, in one embodiment, from a sequencer 130. In the vertex cache, the sequencer 130 provides data fetch instructions (requests) for graphics processing. In one embodiment, the request generator 102 includes a first memory 132, a second memory 134 and an address generator 136. The operations of the request generator 102 will be discussed in further detail with regards to FIG. 3 below. The request generator 102 generates the L2 memory request 112 through the address generator 136 and the memory command 114 to the request processor 108.

The cache controller 104 includes a first memory 140 and a control module 142. The control module 142 is coupled to a second memory 144 capable of storing tag information, wherein tag information includes information relating to storage locations of data. The processing module 142 generates the missing data request 116 which is provided to the memory interface 106. The control module 142 also generates L2 addresses 186 and loaded flags 190 to the request processor 108, wherein loaded flags indicate which data has been loaded into the L2 cache. It should be noted that further level of detail of the operation of the cache controller will be discussed below with regards to FIG. 4.

The memory interface 106 includes a memory 150 for receiving the missing data request signal 116 and provides a buffered signal 152 to a memory request generator 154. The memory request 118 are provided to an external memory 156 or a gateway for accessing external memory, such as external memory 156. The memory interface 106 receives the requested data 120 in parallel memories 158. The data within the memories 158 is provided to a multiplexor 160 and the bus 122 is provided to the request processor 108. The memory interface 106 further includes a processing memory read data module 162 which receives address data from the memory 156 and provides a write address 164 to the request processor 108.

The request processor 108 includes an L2 cache 170, an L1 cache 172, a plurality of L2 request input memories 174, 176, an L1 request input memory 178, an L2 read/L1 write control module 180 and an L1 read write control module 182 for, in one embodiment, parallel data output. The request generator 102 provides an offset index 184 to the L2 request memory 176 and the cache controller 104 provides a per bank L2 address signal 186 to the memory 174. From the memories 174 and 176, an L2 request 188 is provided to the L2 read/L1 write control module 180. The cache controller 104 also provides loaded flags 190 to the L2 read/L1 write control module 180, where the loaded flags indicate data which has been loaded into the L2 cache.

The L2 read/L1 write control module 180 generates a read address command 192 which is provided not only to the cache controller 104, but also to the L2 cache 170. The L2 cache 170 receives the data 122 and provides the data from the L2 cache 170 to the L1 cache 172 through a multiplexer 194. The multiplexer 194 operates in response to a multiplex command 196 from the L2 read/L1 write control 180. The L1 cache 172 also receives a write address command 198 from the L2 read/L1 write control module 180.

The L1 request memory 178 provides an L1 request 200 to the L1 read/parallel write control module 182. The module 182 provides a read address command 202 to the L1 cache 172 and a multiplex control command 204 to a multiplexer 206. Processing information in the L1 cache 172, the cache output 208 is provided to the multiplexer 206 such that memory data 210 is provided as an output. In one embodiment, the output is provided to shader pipes 195 utilizing the SIMD architecture with multiple SIMD processors (not shown). It should be noted, further details of the operations of the request processor are discussed below with regards to FIGS. 5 and 6.

As further discussed relative to FIG. 7 below, in one embodiment, software may be utilized to optimize data accesses during compilation and assembly of executable code. Data accesses are grouped by address into sets, such that each set contains data accesses within a prescribed range (A, A+N) where N is dictated by operation of the present invention. Each such set is comprised of addresses in the range of (A, A+D) where D is a value greater than or equal to zero, but also less than or equal to the value N.

Each such set of localized data accesses are ordered by software such that the first access is the least address (A) of a set, otherwise referred to as the primary data access. Subsequent data accesses within the set are not ordered. These subsequent accesses are commonly referred to as secondary data accesses. All accesses provide the address to be accessed to the vertex cache and the primary data accesses also provide to the vertex cache the range D of the addresses within the set included within the primary access request 110.

In one embodiment, the vertex cache treats primary requests as requests from the memory for the entire range of addresses that fall within the set (A, A+D). These requests are made to a typical L2 memory-based cache which either retrieves the data from the L2 cache immediately, if the data is resident in the cache, or retrieves the data from the L2 cache after issuing request to system memory for the data and loading the data into the L2 cache. Due to memory constraints, some memory immediately preceding A or following A+D may also be retrieved into the L2 cache.

In the present invention, the vertex cache opportunistically groups multiple L2 cache to L1 cache transfers based on conflicts within the L2 memory, into single transfers. In one embodiment, the L1 cache is sized to hold N×M words, where M is the multiplicity of the data upon which a single executable instruction operates in a SIMD architecture utilizing M processors. For example, in an embodiment having a SIMD processor that sets N to a value of 32 and in which a single instruction is able to operate on eight data elements in parallel, the L1 cache is sized to hold 32×8 data elements.

The L1 cache is organized such that it is possible to write N elements of the given primary request to the L1 cache in a single operation. The L1 cache is further organized to read M data elements per M secondary request from the L1 cache in a single operation. All requests, primary and secondary requests, are treated as accesses to the L1 cache. Each such request reads M data elements from the L1, returning the data elements, in parallel, to each of M SIMD processors within the SIMD architecture.

Figure 3:
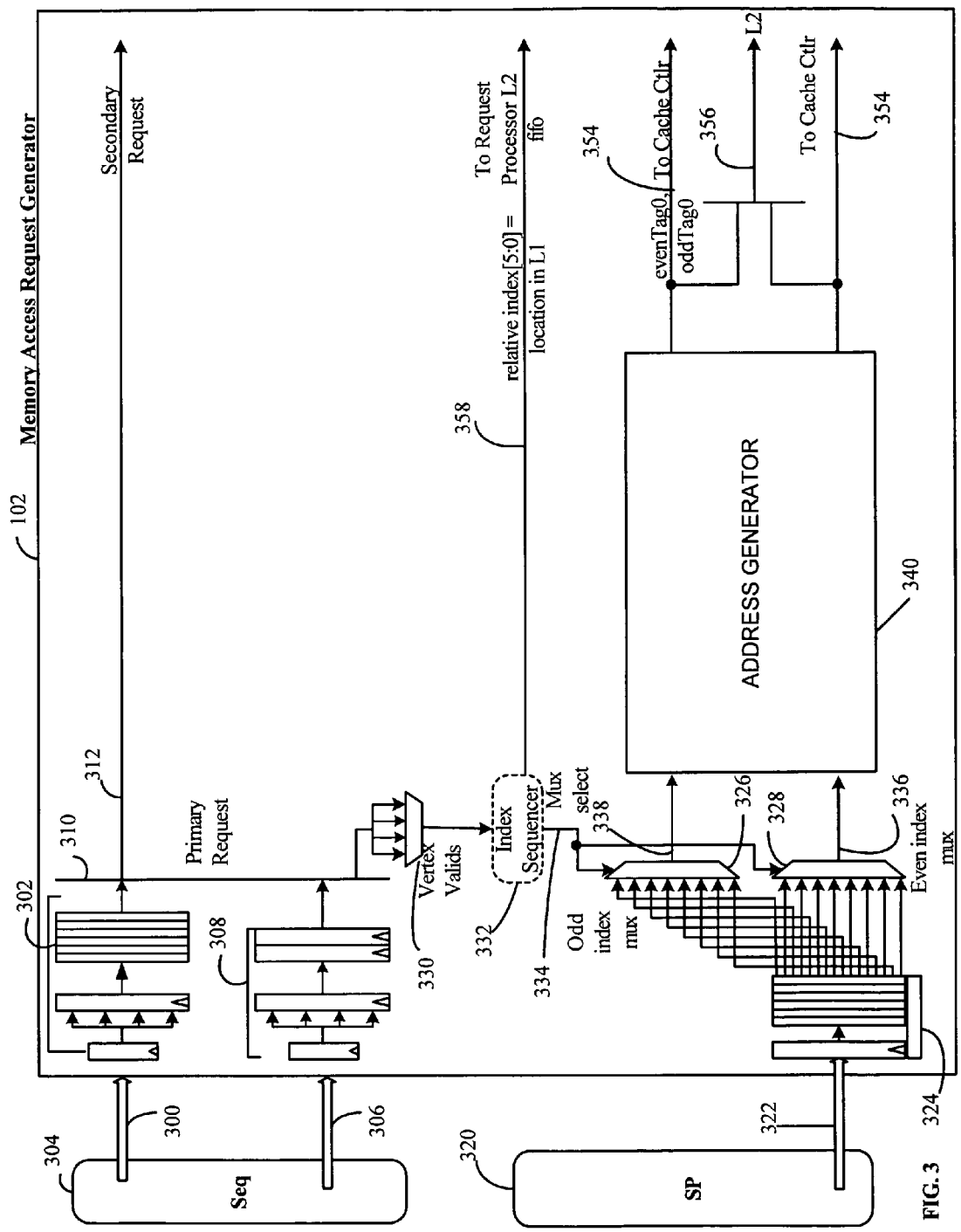
FIG. 3 illustrates one embodiment of a request generator in accordance with one embodiment of the present invention.

FIG. 3 illustrates one embodiment of the memory access request generator 102. In one embodiment, the memory access request generator 102 processes primary access requests to identify L2 cache accesses required to generate the requested data output. The memory access request generator 102 issues a list of commands 358 into a L2 request FIFO, each command being a request to move N data elements from the L2 cache to the L1 cache. Illustrated in FIG. 3, a primary and secondary request FIFO 302 receives the instructions 300 from a shader sequencer 304. For primary requests, the shader sequencer 304 also provides constants 306 to input buffers 308.

Across a bus 310, a command output 312 is provided to the request processor L1 FIFO. Further included across the bus 310 is data from FIFO 302 and FIFO 308 is a primary request.

A shader pipe 320 also provides fetch indices 322 to an input FIFO 324. The input FIFO 324 provides data to two multiplexors 326 and 328, an odd index multiplexor 326 and an even index multiplexor 328. A vertex multiplexor 330 receives the primary request from across the bus 310 and an index sequencer 332 generates a multiplexor select signal 334. Based on the multiplex select signals 336 and 338 are provided to an address generator 340. The generator 340 generates a set of address tags grouped into even and odd address tags 354 in response to the inputs 316, 336 and 338. The generator 340 may be implemented in hardware, software or a combination thereof. The odd tag and even tags 354 are provided to the cache controller and an even word offset and odd word offset 356 is provided to the L2 FIFO within the request processor (108 of FIG. 1).

The index sequencer 332 also generates a relative index 358 based on the output of the multiplexor 330 and provides the relative index 358, which indicates a location in L1 cache, to the L2 FIFO of the request processor. As understood, FIG. 3 illustrates one representative implementation of the present invention and that any other suitable implementation for providing for the command 312, the relative index 358, the tag signals 354 to the cache controller and the signal 356 to the L2 FIFO may be utilized.

Figure 4:
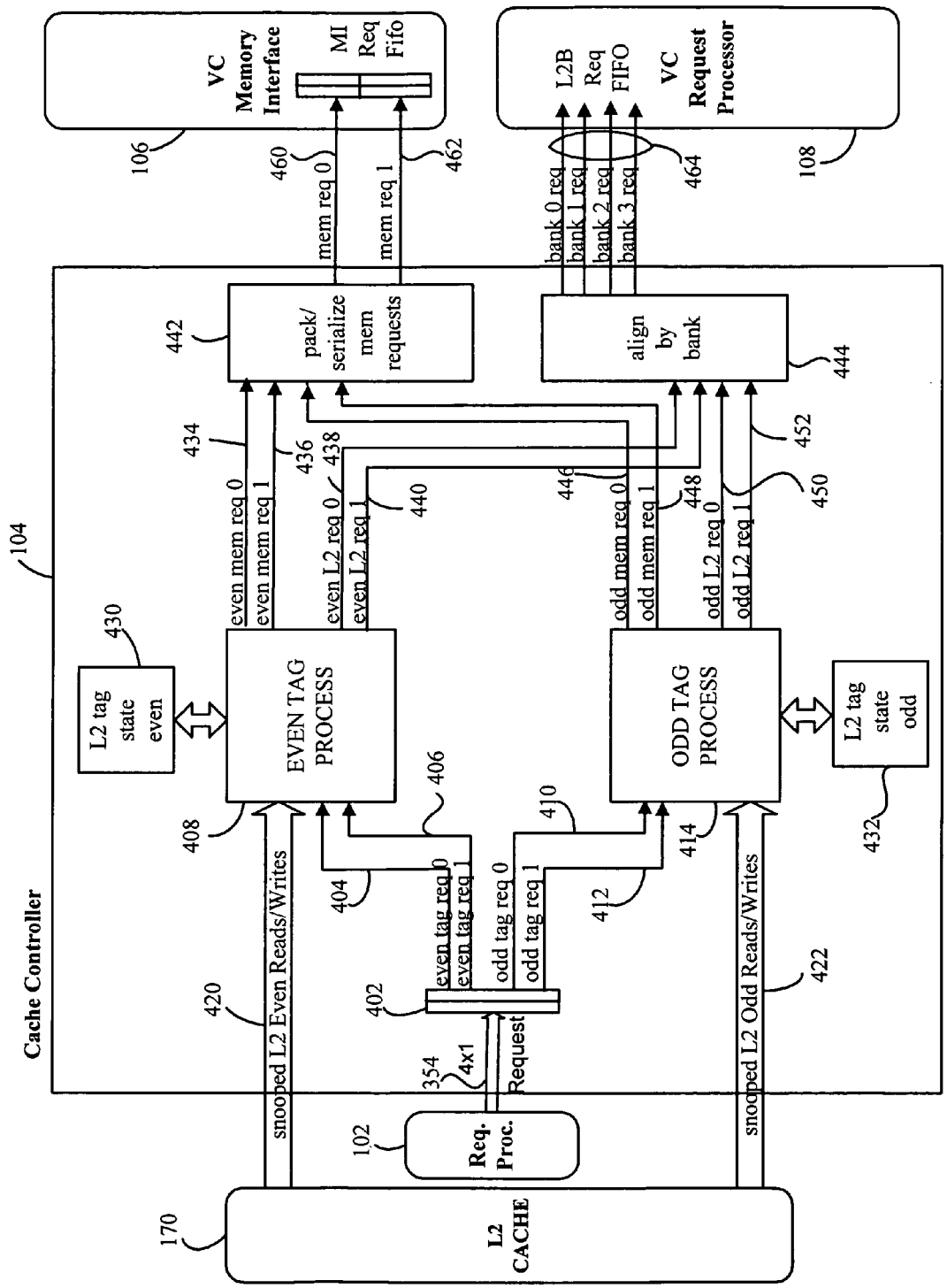
FIG. 4 illustrates a one embodiment of a cache controller in accordance with one embodiment of the present invention.

FIG. 4 illustrates one embodiment of the cache controller 104 including receiving the even and odd tag signals 354 from the memory access request processor 102. The requests 354 are received in the buffer 402 for distributing even tag request zero 404 and even tag request one signal 406 to an even tag processor 408 and an odd tag request zero 410 and an odd tag request one 412 to an odd tag processor 414. The cache controller 104 is further coupled to the L2 cache within the request processor 108 such that it receives snooped L2 even read/writes 420 and snooped L2 odd read/writes 422 which indicate address locations for even and odd data elements which have been written to or read from the L2 cache.

In one embodiment, the tags within the L2 tag state odd 432 and L2 tag state even 430 stores include a tag address, a tag hit count, and tag age. As recognized by one having ordinary skill in the art, the L2 tag state odd 432 and L2 tag state even 430 stores may contain any other suitable information. The odd tag processor 414 and the even tag processor 408 perform various operations on the tags based, in part, on an L2 tag state, an even state 430 relative to the even tag processor and an odd state 432 relative to the odd tag processor 414. In one embodiment, the request generator 102 of FIG. 1 can coordinate with multiple distinct cachelines. Thereupon, testing must be done relative the multiple cachelines, testing performed by the cache controller 104 against each resident cacheline. Therefore, in this embodiment there is a designated odd cache line and even cache line, reducing the number of cacheline tests by half.

The even tag processor 408 generates an even memory request zero 434, an even memory request one 436, an even L2 request zero 438 and an even L2 request one 440. The odd tag processor 414 generates an odd memory request zero 446, an odd memory request one 448, an odd L2 request zero 450 and an odd L2 request one 452. Memory requests 434, 436, 446 and 448 are provided to a module 442 to pack and serialize the memory requests, and the L2 requests 438, 440, 450 and 452 are provided to a module 444 to align the L2 request by bank.

In one embodiment, the cache controller 104 provides a memory request zero 460 and a memory request one 462 to the memory interface 106 and bank L2 request 464 designated by the specific L2 bank to the request processor 108. It should be noted, the cache controller 104 is designated for an L2 cache having four separate banks, but any other suitable number or orientation of banks of memory may be provided for the L2 cache.

Figure 5:
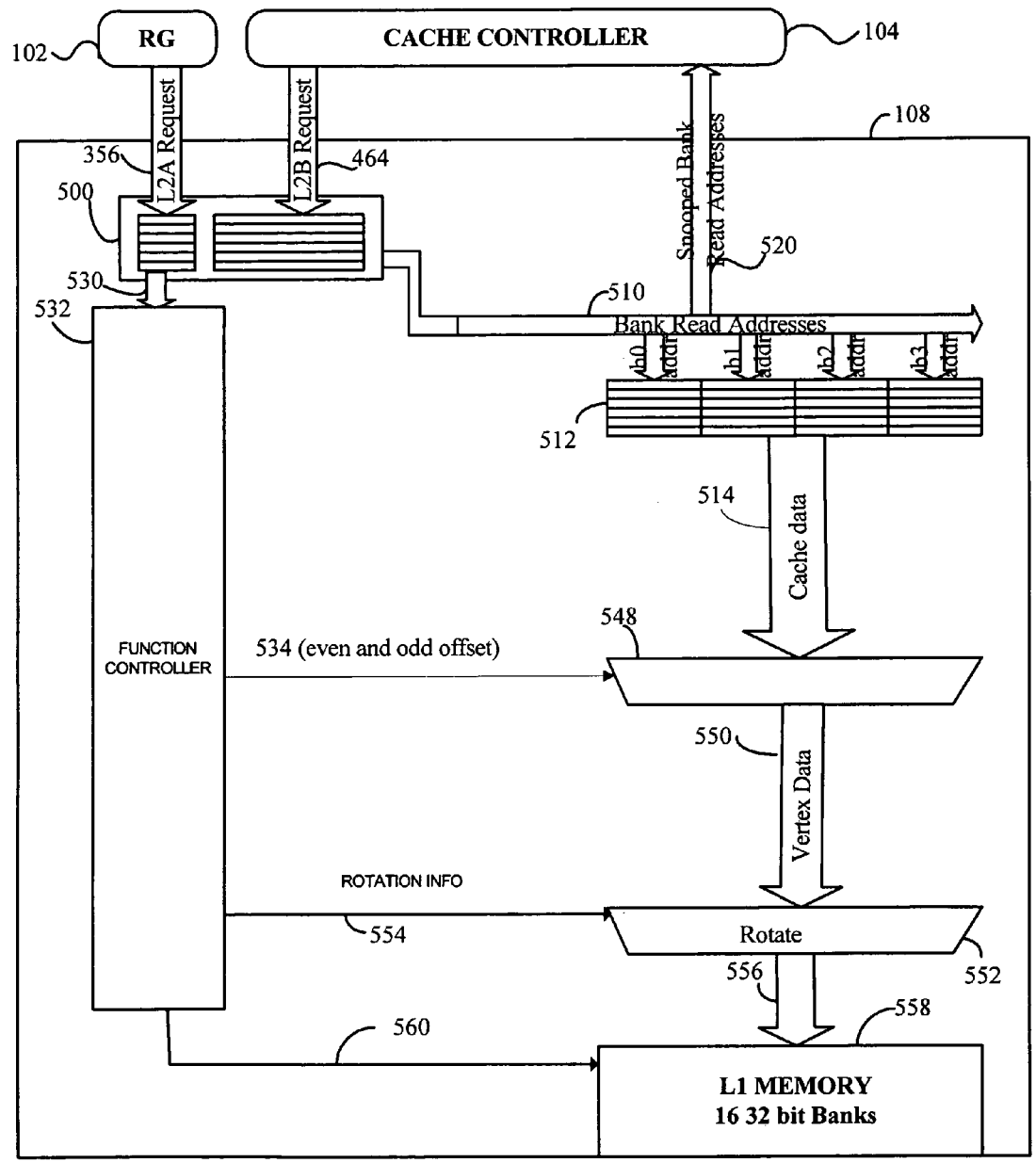
FIG. 5 illustrates in block diagram format a request processor processing L1 requests in accordance with one embodiment of the present invention.

FIG. 5 illustrates one embodiment of the request processor 108 with regards to processing L2 requests 356. An L2 request memory 500 receives the L2 request 356 from the request generator 102. The L2 request memory 500 also receives L2 request 464 from the cache controller 104. The L2 request memory 500 provides a bank read address output signal 510 to the L2 memory 512, based on the requests 356 and 464. In one embodiment, the L2 memory may be four separate 128 bit banks, but any other suitable sized bits per bank and suitable number of banks may be utilized.

The bank read addresses 510 also allow for a snooped bank read address signal 520 to be provided back to the cache controller 104 for acquiring knowledge of bank read addresses within the request processor 108. Using the bank read addresses data is read from the L2 cache 512 providing cache data 514.

Concurrently, the L2 request FIFO 500 provides an index and offset signals 530 to a function controller 532, wherein the control function allows for, among other things, a timing delay to coordinate outputs 534, 554, 560 and 562 with the outputs 514, 550 and 556. The function controller 532 may be implemented in hardware, software of in combination thereof for performing operations as described below.

The Bank Read Addresses 510 are provided to the L2 Cache memory 512. The outputs of the L2 Cache memory, cache data 514, is provided to a multiplexer 548. The multiplexer 548 may rearrange the cache data to provide for selection of both even and odd offsets, 534, within the data to provide an even and odd vertex data 550 which is thereupon provided to a rotation multiplexer 552. The function controller 532 concurrently generates rotation information 554 which is provided to the rotation multiplexer 552. Using the rotation information 554, where the rotation information includes information relating to the rotation of the odd/even vertex data 550, said data is converted into vertex aligned data for providing an L1 data input 556.

In response to the rotation information 554, the rotating multiplexer 552 generates the rotated data 556 which is provided to an L1 memory 558. In one embodiment, the L1 memory 558 may include multiple multi-bit banks capable of storing the rotated data 556. The function controller 532 further generates write addresses 560 provided to the L1 memory 172.

As recognized by one having ordinary skill in the art, FIG. 5 illustrates one general implementation for the request processor 108 in accordance with one embodiment of the present invention. Specific implementations and elements have been omitted for clarity purposes only and any other suitable combination of hardware or software may be utilized to provide for the request processor 108 in the present invention providing for the same level of data flow commands relative to L2 cache data processed in response to L2 request, such as 356 and 464.

Figure 6:
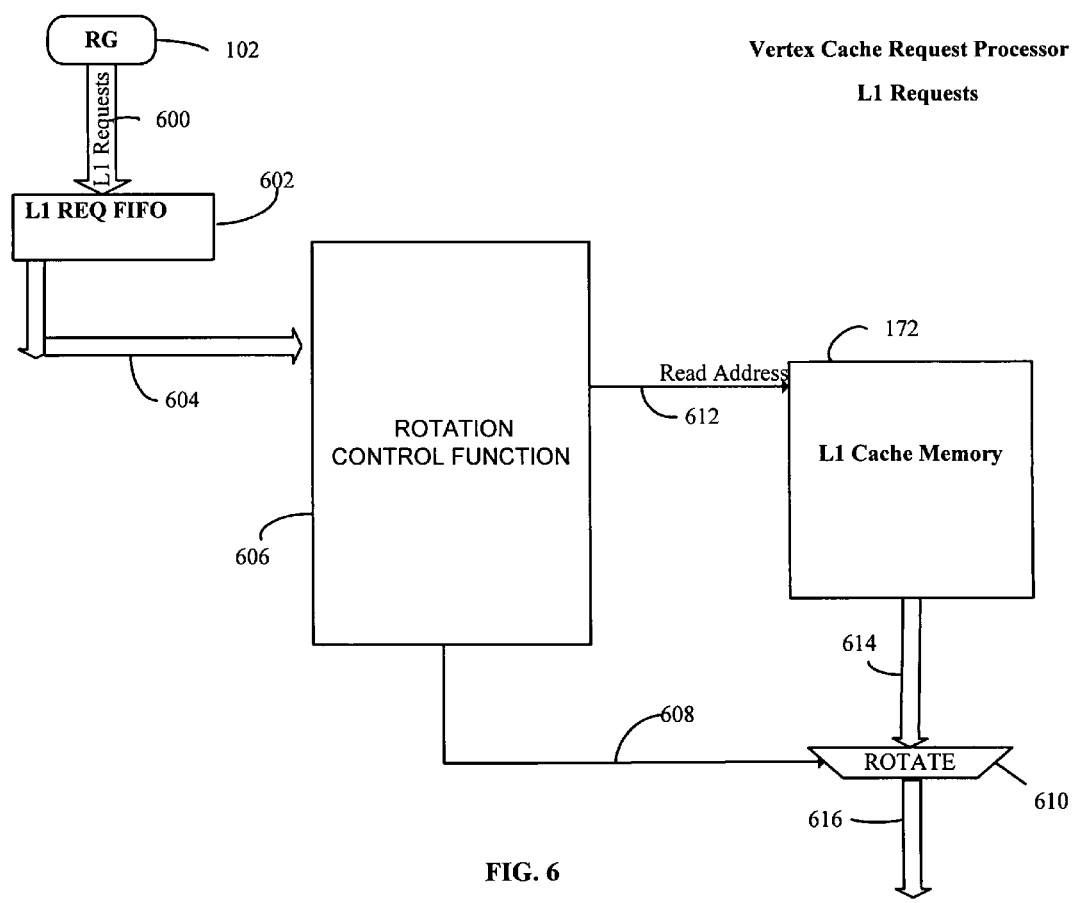
FIG. 6 illustrates in block diagram format a request processor processing L2 requests in accordance with one embodiment of the present invention.

FIG. 6 illustrates a vertex cache request processor, such as the vertex cache request processor 108 described above, processing L1 request 600. The L1 request 600 may be provided by the request generator 102 to a L1 request memory 602. In addition to further processing operations, the L1 request memory 602 provides request information 604 to a rotation control function 606.

One embodiment, the rotation control function 606 may be implemented in hardware, software or a combination thereof capable of performing the operations as described below. In further embodiments, the rotation control function 606 may perform further operations as recognized by one having ordinary skill in the art. In one embodiment, the rotation control function 606 provides a rotation signal 608 to a rotate multiplexer 610 and read address data 612 to the L1 cache 172.

The L1 cache memory 172 storing previously rotated data 556 from the rotate multiplexer 552 of FIG. 5, provides L1 output data 614 in response to the read address command 612 from the rotation control function 606.

In one embodiment, the rotate multiplexer 610 thereupon generates rotated data 616, wherein the rotation provides for correct alignment of data to the processing elements being serviced in parallel (SPs 195 of FIG. 2A). As described above with respect to FIG. 1, parallel data outputs 126 provide similar output as the rotated L1 data 616 of FIG. 6.

Figure 7:
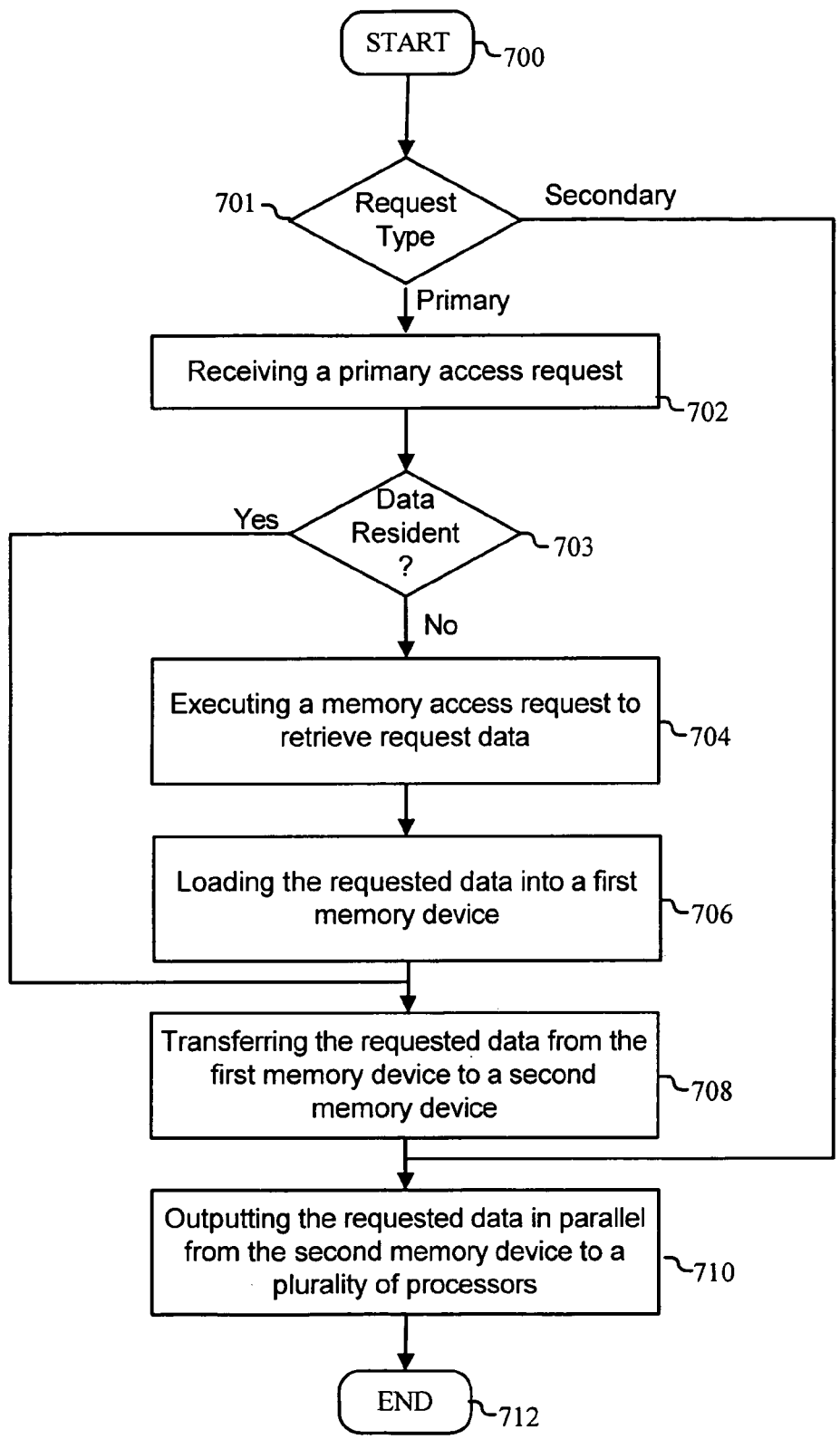
FIG. 7 illustrates a flowchart of a method for single instruction multiple data caching in accordance with one embodiment of the present invention.

FIG. 7 illustrates a flowchart of one method of the steps of one embodiment for SIMD data caching in accordance with one embodiment of the present invention. The method begins, 700, by an initial determination if a memory access request is a primary access request or a secondary access request, step 701. As discussed above, the primary access request is, among other things, directed to a primary address location and the secondary access requests are directed to, among other things, secondary address locations relative to the primary address location. If the access request is a primary access request, step 702 is receiving the primary access request, similar to the primary access request 110 of FIG. 1 received by the memory access request generator 102.

Step 703 is a determination if the data of the access request is currently resident within an existing cache, such as an L2 cache. If the data is not resident, step 704 is executing a memory access request to retrieve requested data. As illustrated in FIG. 1, the requested data 120 is received via the memory interface 106 in response to request 118.

Step 706 is loading the requested data into a first memory device. In one embodiment, the first memory device may be the L2 cache 170 within the request processor 108 of FIG. 2. Step 708 is transferring the requested data from the first memory device to a second memory device. If the determination of step 703 is that the data is resident, the steps 704 and 706 may be omitted. In one embodiment, the second memory device is the L1 cache 172 within the request processor 108. The step of transferring requested data may further include transforming the actual data from a multi-bank format within the first memory device to a variant formatting within the second memory device.

Step 710 is outputting the output data in parallel from the second memory device to a plurality of processors. The plurality of processors are disposed within a SIMD architecture and allow for parallel processing of a single instruction on multiple data sets, the multiple data sets being the requested data. Although, in the embodiment wherein the memory access request is a secondary access request, the method proceeds directly from step 701 to step 710. Regardless thereof, in this embodiment, the method is complete, step 712.

It should be understood that the implementation of other variations and modifications of the invention in its various aspect will be apparent to those of ordinary skill in the art, and that the invention is not limited by the specific embodiments described herein. For example, the L2 cache may have any suitable number of banks and the L1 cache may have any suitable size for data structure to be provided to SIMD processors. It is therefore contemplated to cover by the present invention, any and all modifications, variations, or equivalents that fall within the spirit and scope of the basic underlying principles disclosed and claimed herein.

What is claimed is:

1. An apparatus for single instruction multiple data caching, the apparatus comprising:
    a memory access request generator operative to receive a primary access request;
    a cache controller operatively coupled to the memory access request generator, wherein the cache controller is operative to execute a memory request;
    a memory interface operably coupled to the cache controller, wherein the memory interface is operative to retrieve a plurality of requested data from an external memory, external to said memory interface, based at least on the primary access request; and
    a request processor operably coupled to the cache controller, the memory interface and the memory access request generator, wherein the request processor is operative, for each primary access request, to receive the plurality of requested data, to generate a plurality of parallel data outputs based on the plurality of requested data, and to output the plurality of parallel data outputs to a plurality of processors.

2. The apparatus of claim 1, wherein:
    the memory interface is operably coupled to a level two cache such that the plurality of requested data is stored in a level two cache.

3. The apparatus of claim 2 wherein the cache controller is a level two cache controller.

4. The apparatus of claim 1, wherein the request generator is further operative to:
    identify at least one level two cache access request in conjunction with the primary access request; and
    generate a plurality of access commands to a level two access request memory device.

5. The apparatus of claim 4 wherein the plurality of access commands are commands to transfer data from a level two cache to a level one cache.

6. The apparatus of claim 4, wherein the request generator is further operative to:
    process the plurality of access commands; and
    generate a plurality of second commands to a second command memory device.

7. The apparatus of claim 6, wherein:
    the request generator is operably coupled to the plurality of processors; and
    the plurality of second commands include commands to transfer the data from a level one cache to the plurality of processors.

8. The apparatus of claim 7 wherein the plurality of processors includes a plurality of single instruction multiple data processors.

9. The apparatus of claim 4, wherein the memory is system memory operably coupleable to the memory interface.

10. The apparatus of claim 9 wherein the memory interface retrieves the requested data from the system memory when the cache controller determines that a level two cache does not contain data requested by the request generator.

11. A vertex cache controller for single instruction multiple data caching, the vertex cache controller comprising:

a memory access request generator operative to receive a primary access request;

a level two cache controller operatively coupled to the memory access request generator, wherein the cache controller is operative to execute a memory request;

a memory interface operably coupled to the cache controller, wherein the memory interface is operative to retrieve a plurality of requested data from external memory, external to said memory interface, based at least on the primary access request, wherein the memory interface is also operably coupled to a level two cache such that the plurality of requested data is retrieved and stored in the level two cache; and a request processor including a level one cache, wherein the request processor is operably coupled to the cache controller, the memory interface and the memory access request generator, wherein the request processor is operative, for each primary access request, to receive the plurality of requested data, to generate a plurality of parallel data outputs based on the plurality of requested data and to output the plurality of data outputs to a plurality of processors.

12. The vertex cache controller of claim 11, wherein the request generator is operative to:

identify at least one level two cache access request in conjunction with the primary access request; and generate a plurality of access commands to a level two access request memory device, wherein the plurality of access commands are commands to transfer data from the level two cache to the level one cache.

13. The vertex cache controller of claim 12 wherein the request generator is operative to process the plurality of access commands and operative to generate a plurality of second commands to a second command memory device.

14. The vertex cache controller of claim 13, wherein:

the request generator is operably coupled to the plurality of processors; and the plurality of second commands include commands to transfer the data from the level one cache to the plurality of processors.

15. The vertex cache controller of claim 14 wherein the plurality of processors includes a plurality of single instruction multiple data processors.

16. The vertex cache controller of claim 15, wherein the memory is system memory operably coupleable to the memory interface.

17. An apparatus for single instruction multiple data caching, the apparatus comprising:

a memory access request generator operative to generate a primary access request and a secondary access request, wherein the primary access request identifies a first data set and the secondary access request identifies a subset of the first data set;

a request processor operative to write the subset of the first data set from a first external memory, external to said memory interface, to a second memory based on the secondary access request; and wherein the request processor is further operative, based on the secondary access request and for each primary access request, to generate a plurality of parallel data outputs to a corresponding plurality of processors wherein each data output of the plurality of data outputs contains at least a portion of the subset of the stored first data set.

18. The apparatus of claim 17, wherein the request processor is operative to write the first data set to the first memory based on the primary access request.

19. The apparatus of claim 18, further comprising a cache controller and wherein the cache controller is operative to execute a memory request to obtain the first data set from a third memory.

20. The apparatus of claim 17, wherein the first data set is previously stored in the first memory.

* * * * *